United States Patent [19]

Kumar

[11] 4,069,361
[45] Jan. 17, 1978

[54] WOVEN CARPET BACKING WITH FUSED STAPLE FIBER NEEDLED LAYER

[75] Inventor: Vijayendra Kumar, New Castle, Del.

[73] Assignee: E. I. Du Pont de Nemours and Company, Wilmington, Del.

[21] Appl. No.: 606,007

[22] Filed: Aug. 20, 1975

[51] Int. Cl.² .............................................. B32B 3/02
[52] U.S. Cl. ...................................... 428/95; 428/234; 428/235
[58] Field of Search .......................... 428/95, 234, 235

[56] References Cited

U.S. PATENT DOCUMENTS

| | | | |
|---|---|---|---|
| 3,542,632 | 11/1970 | Eickhoff | 428/95 |
| 3,605,666 | 9/1971 | Kimmel | 428/95 |
| 3,922,454 | 11/1975 | Roecker | 428/95 |

Primary Examiner—Marion E. McCamish

[57] ABSTRACT

This invention concerns an improved shear resistant backing for pile fabrics prepared by needling a batt of staple fiber into a woven fabric of polypropylene yarn of continuous filaments or ribbons and then bonding the structure by fusion of the staple fiber of the batt.

6 Claims, 3 Drawing Figures

WOVEN CARPET BACKING WITH FUSED STAPLE FIBER NEEDLED LAYER

BACKGROUND OF THE INVENTION

Pile fabrics such as rug material have been made by tufting yarns through a backing which has been woven from polypropylene yarns, specifically those made by splitting polypropylene film. This construction is satisfactory for many pile fabrics. However, for tufted pile fabrics which are finished by a printing technique, it is particularly important that they be mechanically resistant to strain by shear stresses in the plane of the fabric. Pile fabrics made by tufting through a woven backing are generally not sufficiently stable to shear and when printed tend to distort and consequently develop inferior print pattern. The provision of a modified woven backing that is resistant to shear has been a worthwhile objective.

SUMMARY OF THE INVENTION

The present invention comprises a shear resistant backing for pile fabrics prepared by needling a batt of staple fiber into a woven fabric of polypropylene yarn of continuous filaments or ribbons and then bonding the structure by fusion of the staple fiber of the batt.

DRAWINGS

DETAILED DESCRIPTION OF THE INVENTION

Figure 1:
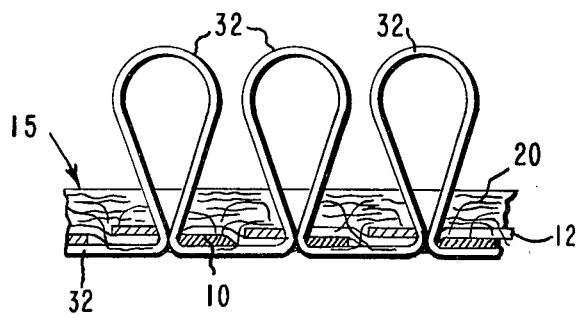
FIG. 1 is a schematic of a cross-section of a typical pile fabric made with the backing according to this invention.

Turning first to FIG. 1 where the pile fabric backing of this invention is illustrated for a loop pile fabric, the backing is seen to comprise first a conventional woven base fabric having polypropylene ribbons both as filling 10 and warp 12. A thin batt of staple fibers 20 has been placed on top of the base fabric, needled therethrough, and then bonded into a shear-stable structure 15 integral with the base fabric. A tufting yarn is then needled up through the shear-stable structure to form a loop pile 32, above the backing. The pile yarns are sufficiently locked in by the backing of this invention for most applications. However, in some cases, it is desirable to apply an adhesive to the bottom of the structure in a conventional manner. As noted in the following examples, pile fabrics made with the backing of this invention exhibit mechanical stability far superior to that of fabrics made with the woven base fabric alone as the backing.

Figure 2:
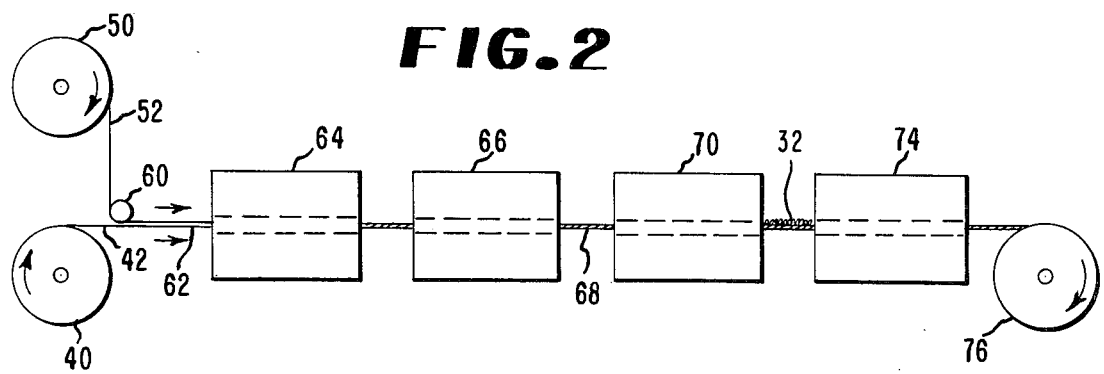
FIG. 2 is a schematic representation of the process steps in preparing the pile fabric backing of this invention and its subsequent tufting.

A process for preparing fabrics according to this invention is shown schematically in FIG. 2. Supply Roll 40 is a supply roll of conventional woven base fabric 42 made from polypropylene ribbon. Roll 50 is a supply roll of a batt 52 of fusible staple fibers. The fabric 42 and batt 52 are withdrawn from the supply rolls and are combined at guide roll 60 before passage through a needle loom 64 wherein the batt 52 is needled down through the woven base fabric 42. The needled structure is then passed through a bonder 66 which may comprise a steam chamber. The bonded composite structure 68 coming from bonder 66 is the pile fabric backing of this invention. It may be then passed through a tufter 70 to provide a loop pile structure which may be printed in printer 74 to provide a design on the fabric. Printed fabric may then be wound up on a roll 76.

The woven base fabric useful in making the product of the invention is a fabric woven of polypropylene yarn (continuous filaments or ribbon). It is commercially available and is ordinarily used in the weight range of 2 to 4 oz/yd$^2$. The staple fiber batt that is needled into the woven base fabric can be made up of any synthetic fiber that can be completely fused by application of heat with or without pressure, or by solvent or chemical means. The sole criterion is that the heat bonding or fusion operation must not adversely affect or fuse the base fabric. For example, the staple fiber batt may be composed of polymer that melts at temperatures below which the yarn of the woven fabric melts. After needling, the structure is heated at temperatures which melt the staple fiber of the batt but not the yarn of the base fabric. Alternatively, the staple fiber batt may be fused by means of a solvent having little or no effect on the yarn of the woven fabric. As mentioned previously the staple fiber is generally laid over the woven base fabric as a batt. These batts are used in the weight range of 0.5 to 3 oz/yd$^2$. Typical staple fibers are low drawn polypropylene fiber, copoly(ethylene terephthalate/isophthalate) 80/20 or 70/30 fiber, etc. No significant amount of individual staple fibers are present at any level within the batt after the composite has gone through the bonding operation.

TEST PROCEDURES

Figure 3:
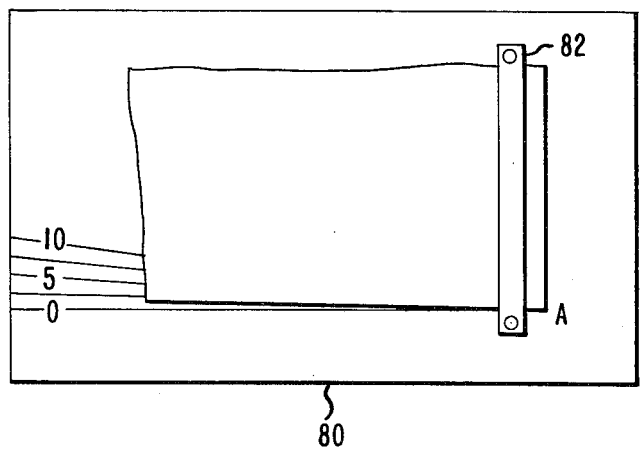
FIG. 3 is a plan view of a test jig for measuring shear angle prior to buckling for pile fabrics.

For the tufted materials, the shear-stability test was carried out by means of an apparatus shown in FIG. 3. It comprises a smooth-surfaced table 80 having a clamping arrangement 82 near one end. Table 80 has a first line OA placed thereon near one edge and a series of shear angle deflection lines extending from point A. A sample to be tested is cut approximately 10½ inches by 14 inches (26½ × 35½ cm) with the long dimension parallel to the warp yarns of the woven base fabric and placed with one end clamped under clamp 82 so that one corner is aligned with point A. The other end of the specimen is then slowly pushed away from line OA in the plane of table 80 until the start of observed fabric buckling. The displaced angle made by the side of the specimen with OA is noted and recorded as the "shear-angle".

A different apparatus was used to determine comparative shear-stability for untufted backing materials. In principle the apparatus operates in a manner similar to the test procedure for the tufted fabrics but a micrometer is used to control the displacement in the plane of the backing material until buckling is noticed. The shear angle is calculated based on the micrometer reading.

The invention is further illustrated by the following examples.

The woven base fabric employed in the examples was a commercial product of 3.2 oz/yd$^2$ (108 g/m$^2$) weight made of ribbon yarn slit from polypropylene film. ("Poly-Bac" 2400, manufactured by the Patchogue-Plymouth Co.). A series of batts as follows were made to serve as overlay materials. Three such batts (Batts 1, 2 and 3) were made from 8.2 denier polypropylene staple fiber (Hercules, Inc. minimum draw) having a tenacity of 1.37 grams/denier and a cut length of 2.2 inches (5.6 cm). Batt 1 was 0.5 oz/yd$^2$ (17 g/m$^2$). Batt 2 was 1.0 oz/yd$^2$ (34 g/m$^2$) and Batt 3 was 2.0 oz/yd$^2$ (67.9 g/m$^2$).

Batt 4 is a batt of a staple fiber of a copolyester poly(ethylene terephthalate/*isophthalate*) (70/30). The staple fibers were 4.5 denier, 4–5 grams per denier tenacity, and 2.5 inches (6.4 cm) in length. The copolyester batt was 2.0 oz/yd$^2$ (67.9 g/m$^2$).

Samples of each of the above-mentioned batts were then laid on samples of the woven polypropylene base fabric and then needled at 400 penetrations/in$^2$ (62 pen/cm$^2$) and ½ inch (13 mm) penetration depth so that the overlay fibers of the batt are well anchored into the base fabric. The needled composites were then subjected to a bonding operation.

The three composites having needled polypropylene staple fiber overlays were bonded by passing them through a steam bonder of the type described in Wyeth, U.S. Pat. No. 3,313,002 comprising an elastomer covered top roll in nip formation with a perforated bottom roll containing steam at 312° C (156° C) at a speed arranged to provide 0.33 sec. residence time. The composite having needled copolyester staple fiber was bonded by passing it through a pair of hot calender rolls set with 40 tons per linear inch (14.3 T(met)/cm) pressure. The calender rolls were at a temperature of 290° F (143° C) and operated with speed set to provide 0.14 sec. residence time. The resulting composite structures with the needled staple fibers fully bonded (fused) constitute products of this invention. A sample of each of these four composite structures were tested for shear-stability along with a control which is the woven base fabric ("Poly-Bac" 2400). Results are reported in Table I below.

Additional samples of each of the four composite structures and the woven base fabric control were tufted with 1300 denier bulked continuous filament nylon in a 1/16 inch (1.6 mm) gauge print style with 10 stitches per inch (4 spcm) and ⅛ inch (3.2 mm) pile height. The tufted samples were tested for shear stability and the results reported in Table I below.

A very pronounced improvement in shear stability of not only the tufted samples but also of the backing prior to tufting was demonstrated by means of the laboratory tests.

TABLE I

| Item | Component Identification | Shear Angle Before Buckling | |
|---|---|---|---|
| | | Prior to Tufting | Tufted Carpet |
| 1 | Batt 1 over woven polypropylene base fabric | 0.12 | 3 |
| 2 | Batt 2 over woven polypropylene base fabric | 0.08 | 2 |
| 3 | Batt 3 over woven polypropylene base fabric | 0.05 | 1 |
| 4 | Batt 4 over woven polypropylene base fabric | 0.09 | 2 |
| 5 | Control woven polypropylene base fabric | 6.00 | 5 |

It should be understood that the figures given in Table I are for the purpose of comparison of the items in the table. The data show that Item 5 shears (distorts in the plane of the fabric) much more than the products of the invention (Items 1 to 4) before any buckling is noted. This type of shear instability can cause bowing and skewing during a printing process and can prevent one from obtaining good pattern definition in printed carpets. When the shear is relaxed, the printed pattern lines and shapes are distorted.

What is claimed is

1. An improved shear-resistant backing for pile fabrics prepared by needling a batt of staple fiber into a woven fabric of polypropylene yarn of continuous filaments or ribbons and then bonding the structure by fusion of the staple fiber of the batt.

2. The backing of claim 1 wherein the staple fiber is polypropylene.

3. The backing of claim 1 wherein the staple fiber is a copolyester.

4. The backing of claim 1 wherein the batt is heat bonded.

5. The backing of claim 1 wherein the woven fabric of polypropylene has a weight of from 2 to 4 oz/yd$^2$ and the staple fiber batt weighs from 0.5 to 3 oz/yd$^2$.

6. A shear-resistant pile fabric comprising the backing of claim 1 and having pile yarn tufted therethrough.

* * * * *